Aug. 18, 1925.

W. H. BARLING 1,550,416

CONTROL DEVICE

Filed Feb. 5, 1924  2 Sheets-Sheet 2

INVENTOR
Walter H. Barling
BY
Robert H. Young ATTORNEY

Patented Aug. 18, 1925.

1,550,416

UNITED STATES PATENT OFFICE.

WALTER H. BARLING, OF DAYTON, OHIO.

CONTROL DEVICE.

Application filed February 5, 1924. Serial No. 690,794.

*To all whom it may concern:*

Be it known that I, WALTER H. BARLING, a citizen of the United States, residing at Dayton, in the county of Montgomery and State of Ohio, have invented certain new and useful Improvements in Control Devices, of which the following is a specification.

This invention relates to a control device, and more particularly of the kind used in airplanes, either for the control of ailerons and elevators or for the control of multiple engines or groups of engines.

One object of this invention is the provision of a control device especially adapted for use upon airplanes which may be movable in the desired direction and which may be automatically locked in the adjusted position after the same has been attained by merely removing the hand of the operator.

A second object is the provision of a locking device upon a control rod which will maintain the control rod locked in its adjusted position wherever this position might be, the locking device operating in the same manner, whether the lever is in its normal position or at some position remote therefrom.

Another object is the provision of an extension on the main control rod which is normally maintained in alignment therewith by a spring so that when the operator moves the extension to adjust the main control rod, a braking force is instantly automatically reduced so as to permit a comparatively free operation of the main control rod, yet which will automatically instantly apply the braking device when the hand is removed.

A further object resides in the manner in which the control lever is supported so as to be rotated about a plurality of intersecting axes, the control lever being mounted upon a shaft which is in turn held by a second shaft, the two shafts and the axis of the lever all intersecting at a common point.

A further object is the provision of a limiting stop for the motion of a control lever which is adapted to move about a plurality of intersecting axes, this limiting stop being provided with a square opening, the sides of this opening forming the stop for the control lever. A stop of this kind is particularly suited for a control lever adapted to control a plurality of groups of motors so that as the lever is moved about both axes simultaneously to a new position, it will be impossible to increase the speed of either group of motors beyond a predetermined safe point.

Other objects will be more fully set forth in the attached detailed description and claims, and in the drawings, in which:—

Figure 1:
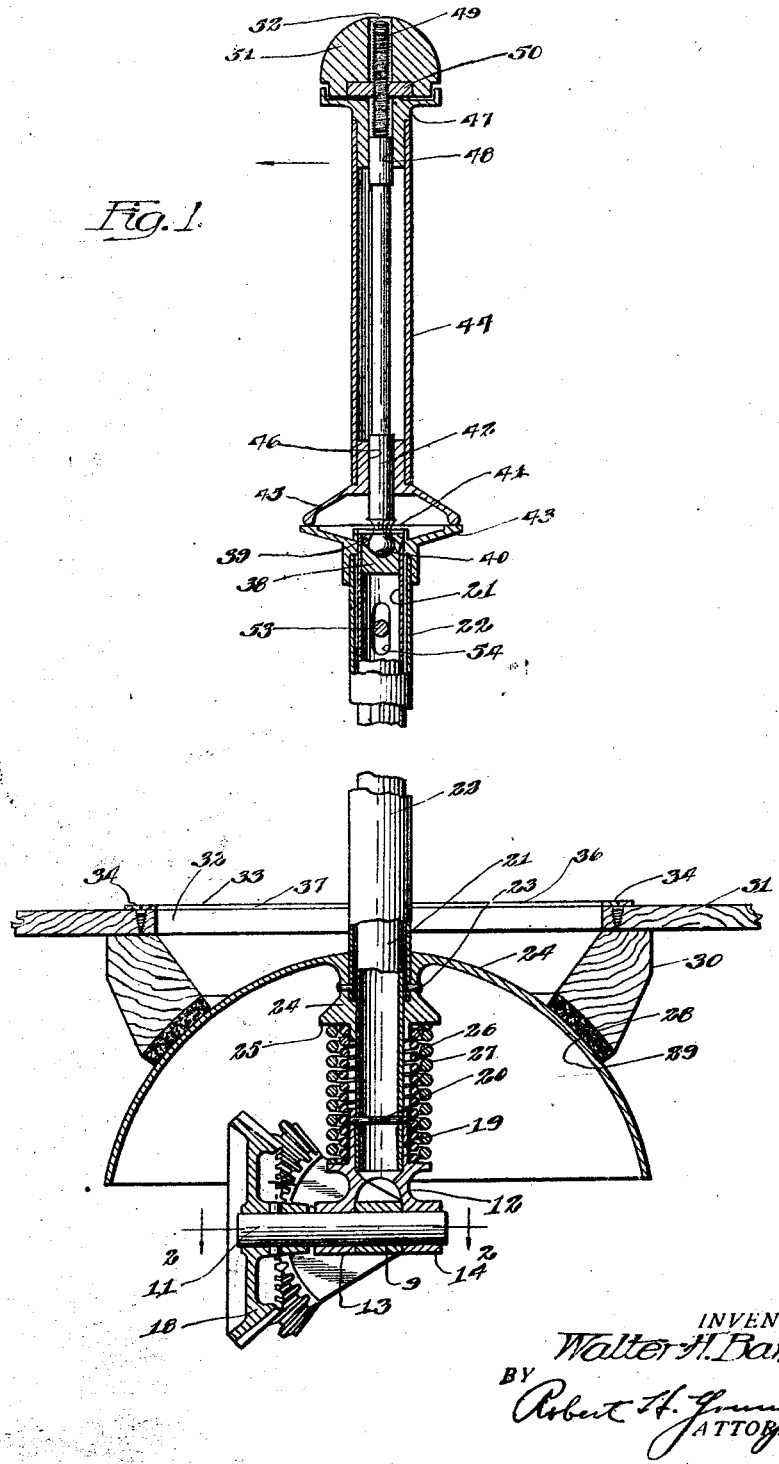
Fig. 1 is a vertical section taken through the center of the control device.

Referring to the drawings more particularly by reference numerals, a plurality of fixed bearings 1 and 2 are provided upon any suitable part of the airplane framework where the device is to be used in an airplane for the control of the steering devices or for the control of a plurality of groups of motors where one group is located, for example, on the right side of the airplane and the second group upon the left side of the airplane.

The fixed bearings mentioned support sleeves 3 and 4 respectively, to which are attached, as shown at 5, a suitable lever or other device to which the control cables or wires may be connected. These sleeves 3 and 4 are hollow and form a support for a shaft 6, one end of which has a projection inside of the hollow sleeve 3, the other end of which, as shown at 8, projecting into the inside end of sleeve 4. The shaft 6 is provided between its ends with a block 9 made integral therewith, the block 9 being provided with a central hole 10 through which extends a shaft 11, the shaft 11 being freely rotatable within the hole or bearing 10. It will be seen thus far that the sleeves 3 and 4, which are rotatably supported in the fixed bearings, form a support for the shaft 6, this shaft 6 in turn forming a support in which a second shaft 11 is rotatably mounted.

A bifurcated operating casting 12 having bifurcations 13 and 14, each of which is rigidly attached to the shaft 11 by means of central pins 15 extending through both the shaft 11 and the parts 13 and 14 of the operating casting surrounding this shaft, is provided.

Figure 2:
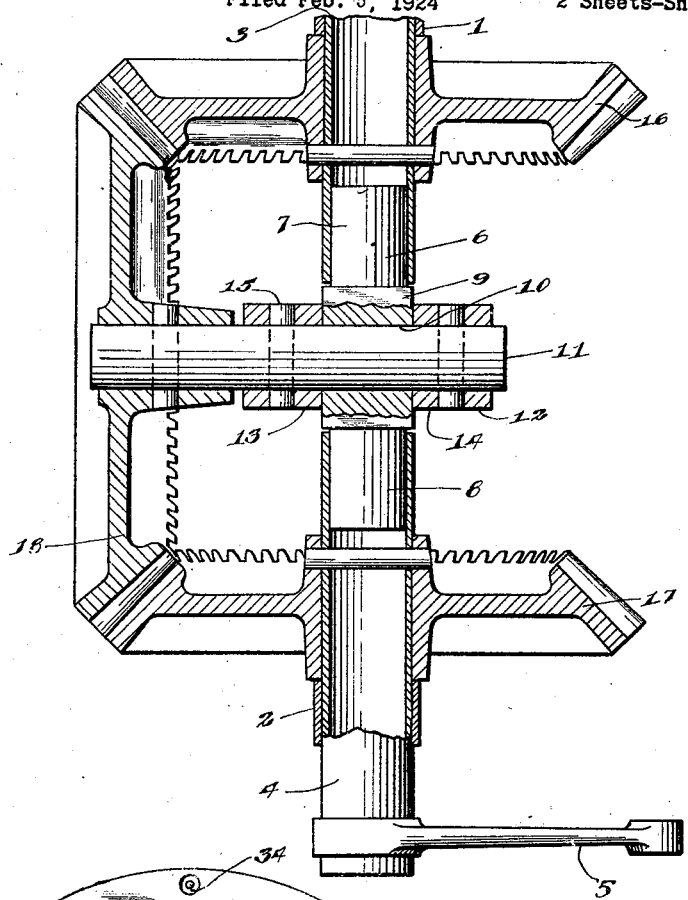
Fig. 2 is a horizontal section of the mounting shafts taken on the line 2—2 of Fig. 1.

A bevel gear 16 is fixed to the sleeve 3 by a suitable pin or other attaching device and a similar bevel gear 17 is likewise attached to the sleeve 4. A third bevel gear 18 is rigidly attached to the end of shaft 11. Bevel gear 18 meshes with both gears 16 and 17 as shown in Fig. 2.

The operating casting 12 is provided with an upwardly extending cylindrical portion 19 which is rigidly attached by means of a pin 20 or any other suitable means to a rod 21 fitting within the part 19. This rod 21 forms the main part of a controlling lever which extends vertically upwardly from the intersection of the shafts 11 and 6.

Mounted upon the shaft 21 so as to freely move up and down upon the same is a sleeve 22 connected by pins or other suitable fastening devices 23 to a friction member 24 having a general spherical shape and having a radius of curvature at the intersection of the axes of shafts 6 and 11. The friction member 24 is provided with a hub part 25 which attaches the friction member to the sleeve 22. This hub part 24 is provided with an inner bore which has a sliding fit upon the rod 21. The hub 24 is also provided with a horizontal surface 25 forming a sort of a thrust member against which two springs 26 and 27 bear. The lower end of these springs 26 and 27 finds a support upon a horizontal surface provided upon the bifurcated operating casting 12. The springs 26 and 27 in the position shown in Fig. 1 are under compression and serve normally to exert an upward force against the clutch member or friction member 24 in regards to the control lever 21. The springs 27 and 26 are preferably of different sizes as shown, the inner spring being formed of wire having a smaller cross sectional area.

Figure 3:
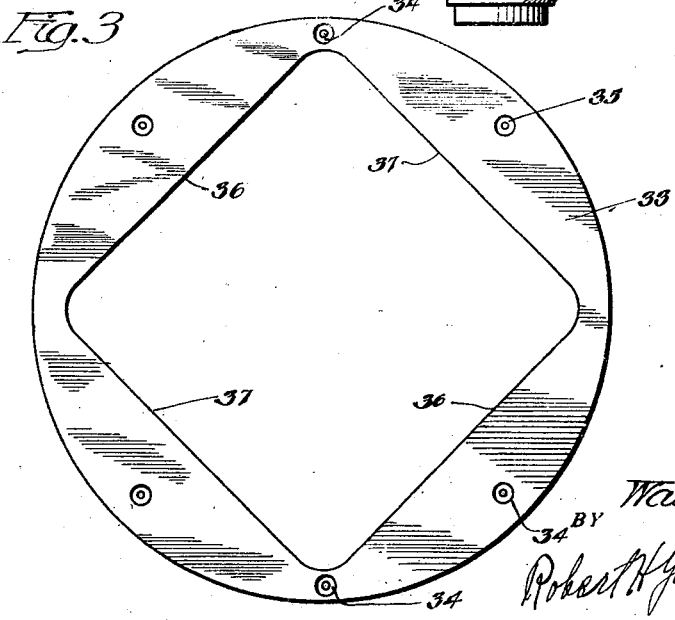
Fig. 3 is a detail plan view of the limiting stop.

A fixed friction member 28 of leather or other suitable friction material is formed with a surface 29 which has a radius of curvature equal to the radius of curvature of the friction member 24. This friction member 28 is in the form of a ring centrally located in regard to the normal position of the control lever 21. It is held in this position by any suitable means such as the brackets 30 which are attached to the under side of the fuselage framework 31, the latter being provided with a circular opening 32 through which the control lever 21 may project. Fixed upon the upper surface of the fuselage framework 31 is a plate 33 shown in detail in Fig. 3, this plate being attached by means of screws 34 and 35 to the fuselage framework. The outside form of this plate 33 may have any suitable shape. A square opening is formed in this plate 33, this opening being defined by the sides 36 and 37. The two sides 36 extend in two parallel planes which are located 45 degrees away from both of the axes of shafts 11 and 6, for a purpose which will be more fully set forth.

Fixed within the upper part of the control rod 21 in any suitable manner are two blocks 38 and 39 which form a socket 40 for the reception of a ball 41 attached to or forming an integral part of the end of a rod 42 which is in effect, an upward vertical extension of the main control rod 21, the ball and socket joint forming a flexible connection between these two parts. A flanged member 43 is fixed upon the upper end of the sleeve 22, and this flange casting 43, is provided with an inner bore which permits free movement of the same upon the main control rod 21.

Surrounding the vertical extension 42 of the control rod is a sleeve 44, the lower end of which is rigidly attached to a flanged projection 45 which bears upon the casting 43 at points removed from the vertical axis of the main control rod 21. The flanged projection 45 is provided with an inner bore 46 within which the adjacent part of the extension rod 42 is adapted to freely slide. The upper end of the sleeve 44 is rigidly attached to a part 47 which is provided with an inner bore 48 within which the upper end of the extension rod 42 is adapted to freely slide. The extension rod 42 is therefore spaced from and guided freely within the sleeve 44. The upper end of the extension rod 42 is provided with screw threads 49 which are adapted to be engaged by the corresponding threads of a nut 50, the nut 50 being held in fixed position as regards to a knob 51 having a general hemispherical shape which bears against the upper surface of the part 47. A hole 52 in the center of this knob permits the free movement of the upper thread end of the extension rod 42, but it will be seen that the nut 50 which is attached to the knob 51 will be rotated when the knob is manually turned by the hand of the operator so that the extension rod 42 will be lengthwise adjusted within the sleeve 44.

A pin 53 is attached to the sleeve 22 and extends through a slot 54 extending vertically in the control lever 21. This serves as an effective stop limiting device for the adjustment of the tension exerted by the springs upon the brake friction members.

The operation of the control device will now be more fully set forth. The hand control lever which consists of the extension of the main control rod 21, is adapted to be moved fore and aft in a longitudinal plane about the axis of the shaft 6, this movement serving to tilt the shaft 11 so as to raise the left hand end of shaft 11 upwardly when the upper end of the control lever is moved to the right from the position shown in Fig. 1. This will have the effect, as more clearly shown by referring to Fig. 2, of equally rotating the gears 16 and 17 so as to cause a correspondingly equal movement of the sleeves 3 and 4. Such a movement may be utilized to adjust the throttles of a group of engines upon the right-hand side of the ship in the same manner as the throttles on the left side of the ship are adjusted. That is, all of the engines may be speeded up or slowed down equal degrees.

The control lever is also adapted to rotate laterally about the axis of the shaft 11, such a movement causing a rotation of the gear 18 serving to rotate the gears 16 and 17 to equal degrees in opposite directions. This movement is transmitted through the sleeves 3 and 4 so as to cause, for example, the motors on one side of the ship to be speeded up while the throttles of the motors on the opposite side are being closed.

It will be obvious that the friction clutch member 24 is always urged upwardly against the friction leather 28 so as to maintain the control lever in the position in which it is left after the removal of the hand of the operator. When a force is exerted upon the upper end of the sleeve 44 tending, for instance, to move the extension 42 in the direction shown in the arrow in Fig. 1, if the braking force between the members 24 and 28 is small, the control lever 21 and the extension rod 42 will remain in alignment and the control lever adjusted to its desired position with little or no real movement of the friction member 24 away from the friction leather 28. If for any reason the friction between these friction members 24 and 28 should be increased, or if the two members should tend to stick together, operation of the control lever would be difficult, the springs 26 and 27 will be compressed by the pressure which will be exerted downwardly upon the casting 43 of the sleeve 22. This will result in a slight downward movement of the spherical friction member 24 and reduce the friction between that member and the friction leather 28 to such an extent that motion will be permitted. The friction between the friction members 24 and 28 will thus be automatically maintained at a constant value, while the control lever is being operated. After the movement of the control lever to its desired position, the hand of the operator is removed and as soon as the pressure against the upper end of the auxiliary extension 42 is removed, the springs 26 and 27 force the sleeve 22 and the friction member 24 upwardly and the extension 42 and the lever 21 are immediately aligned.

If it is desired to adjust the tension of the spring exerted in maintaining the friction member 24 against the friction leather 28 so as to permit easier or more difficult operation of the control lever, a rotation of the hand knob 51 about a vertical will insure in lowering or raising the sleeve 44 in relation to the extension lever 42. This will cause a corresponding change in the force required to be exerted against the upper end of the extension lever 42 before that member is moved out of alignment with the operating lever 21 and consequently before a corresponding release in the braking effect.

The stop-limiting member 33 as before stated has two sets of parallel sides 36 and 37 which are located in planes at 45 degrees to the axes of shafts 6 and 11. This precise arrangement is desirable and particularly advantageous when the control device is used for the controls of two motors or sets of motors, one on each side of the central axis of the airplane. The opening in the member 33 is made sufficiently large so that when the control lever is moved, for example in the direction opposite to the arrow shown in Fig. 1, which corresponds to the direction opposite to the arrow shown in Fig. 3, to the limit of its movement, the throttles of both groups of motors will be entirely opened. If, at this time, it is desired to cause a turning effect of the airplane about a vertical axis, this may be done by decreasing the speed of the motors on one side of the center of the airplane and simultaneously increasing the speed of the motor or motors on the opposite side. It would however be undesirable to attempt to open the throttle wider after its adjustment corresponding to an extreme forward movement of the control lever. For this reason, the sides 36 and 37 of the opening in the stop member are shaped as they are so as to cause a decrease in the speed of both motors at the same time after the speed of both motors is changed in reverse senses for turning effect. In other words, it is impossible to ever move either the shaft 11 or the shaft 6 to such an extent as would tend to open the throttles of either of the motors beyond a predetermined point.

I claim:

1. A control device comprising a manually operated lever, a support for the same, means mounting said lever on said support so as to move about an axis, a curved friction member mounted on said lever, means urging said member in one direction at 90° to said axis along the length of said lever, and means for automatically moving said friction member in the opposite direction along said lever when said lever is manually operated.

2. A control device comprising a lever, a support for the same, means mounting said lever on said support so as to move about an axis, a curved friction member mounted on said lever, means for moving said friction member along said lever, said last-mentioned means including an extension of said lever in alignment therewith.

3. A control device comprising a lever adapted to move about a plurality of axes, a spherical friction member mounted on said lever, a fixed friction member co-acting therewith, and means for moving the spherical member away from the fixed friction member when the friction between these two members tends to prevent manual movement of the control device.

4. A control device comprising a lever adapted to move about a plurality of axes, a spherical friction member mounted on said lever, a fixed friction member co-acting therewith, and means for automatically reducing the pressure between these friction members when the surfaces thereof tend to stick.

5. A control device comprising a lever adapted to move about a plurality of axes, a spherical friction member mounted on said lever, a fixed friction member co-acting therewith, and means for moving the spherical member away from the fixed friction member when the friction between these two members tends to prevent movement of the control device, said last mentioned means including an extension of said lever aligned therewith.

6. A control device comprising a lever adapted to move about a plurality of intersecting axes, a spherical friction member mounted on said lever, a fixed friction member coacting therewith, spring means normally urging said members together and means for overcoming part of the spring force, comprising an extension of said lever, the said extension being held in substantial alignment with said lever by said spring.

7. A control device comprising a lever, a support for the same, means mounting said lever on said support so as to move about a plurality of axes intersecting at a common point, a spherical friction member, a sleeve on said lever for mounting said friction member movably on said lever, a compression spring between the said friction member and the said common point, and a stationary friction member having a spherically curved face normally in contact with said spherical friction member, both of said friction members having substantially equal radii of curvature and having their centers substantially at the point of intersection of said axes.

8. A control device comprising a lever, a support for the same, means mounting said lever on said support so as to move about a plurality of axes intersecting at a common point, a spherical friction member, a sleeve on said lever for mounting said friction member movably on said lever, a compression spring between the said friction member and the said common point, and a stationary friction member having a spherically curved face normally in contact with said spherical friction member, both of said friction members having substantially equal radii of curvature and having their centers substantially at the point of intersection of said axes, and mechanism for slightly moving said friction members away from each other when the lever is operated.

9. A control device comprising a lever, a support for the same, means mounting said lever on said support so as to move about a plurality of axes intersecting at a common point, a spherical friction member, a sleeve on said lever for mounting said friction member movably on said lever, a compression spring between the said friction member and the said common point, and a stationary friction member having a spherically curved face normally in contact with said spherical friction member, both of said friction members having substantially equal radii of curvature and having their centers substantially at the point of intersection of said axes, and mechanism for slightly moving said friction members away from each other when the lever is operated, said mechanism comprising an extension on said lever, normally in alignment therewith and attached thereto by a flexible connection, and a projection on said extension adapted to press against said sleeve when the lever and its extension are moved out of alignment.

10. A control device comprising a control rod, a support for the same, means rotatably mounting said rod on said support, an operable locking member, an elongated hand-operated device normally in substantial alignment with said rod, a flexible connection between said rod and said device, a lateral projection on said device adjacent said connection, and means operably connected to said operable locking member and operated by said lateral projection when the rod and device are moved out of alignment, and means normally maintaining said rod and said device in alignment.

11. A control device comprising a control rod, a support for the same, a means rotatably mounting said rod on said support, an operable locking member, an elongated hand-operated device normally in substantial alignment with said rod, a flexible connection between said rod and said device, a lateral projection on said device adjacent said connection, means operably connected to said operable locking member, and operated by said lateral projection when the rod and device are moved out of alignment, means normally yieldingly maintaining said rod and said device in alignment, and means for adjusting the position of said projection in relation to said device.

12. A control lever having a main control rod and an upper hand-operated extension in alignment with the same, a ball and socket connection between the rod and the extension, a spring for yieldingly maintaining said extension and rod in alignment, a knob on the upper end of said extension and means operated thereby to adjust the effective force of the spring.

13. A control lever having a main control rod and an upper hand-operated extension connected thereto by a ball and socket joint, a sleeve on said extension provided with a projection, means operable to adjust the sleeve in relation to the extension and a spring connection to normally press upwardly on said projection and yieldingly maintain the rod and the extension in normal alignment.

14. A control device comprising a lever mounted to oscillate about two axes, the axes intersecting each other and the axis of the lever at a common point, a member having a square opening therein limiting the movement of the lever and located to one side of the said common point, two controlling parts, and means interconnecting said lever and parts so as to move the parts in the same direction and to equal degree when the lever is moved in the direction of one of the diagonals of the said square from a normal position, and so as to move the parts equal amounts in relatively opposite directions when the lever is moved from normal position in the direction of the other diagonal.

15. A control device comprising a lever, a shaft upon which said lever is rigidly mounted, a second shaft extending at ninety degrees to the first said shaft, and at ninety degrees to the lever, and supporting said first shaft, a plurality of members rotatably supporting said second shaft, a fixed bearing for each member, a gear connected to each member, a gear intermeshing therewith and connected to said first shaft.

16. A control device comprising a lever, a shaft upon which said lever is rigidly mounted, a second shaft extending at ninety degrees to the first said shaft and at ninety degrees to the lever and rotatably supporting said first shaft, a plurality of members rotatably supporting said second shaft, a fixed bearing for each member, a bevel gear connected to each member and a bevel gear intermeshing therewith and connected to said first shaft, whereby said members may be rotated in the same or opposite directions by movement of said lever about one or the other of said shafts.

17. A control device comprising a lever, a shaft upon which said lever is rigidly mounted, a second shaft extending at ninety degrees to the first said shaft and at ninety degrees to the lever and rotatably supporting said first shaft, a plurality of members rotatably supporting said second shaft, a fixed bearing for each member, a bevel gear connected to each member, a bevel gear intermeshing therewith and connected to said first shaft, whereby said members may be rotated in the same or opposite directions by movement of said lever about one or the other of said shafts, and a stop member for limiting the movement of said lever, said stop member having two sets of parallel sides lying in vertical planes which intersect both said shafts at an angle of forty-five degrees.

18. A control device comprising a lever, a shaft upon which said lever is rigidly mounted, a second shaft extending at ninety degrees to the first said shaft and at ninety degrees to the lever and rotatably supporting said first shaft, a plurality of members rotatably supporting said second shaft, a fixed bearing for each member, a bevel gear connected to each member, a bevel gear intermeshing therewith and connected to said first shaft, whereby said members may be rotated in the same or opposite directions by movement of said lever about one or the other of said shafts, a stop member for limiting the movement of said lever, said stop member having two sets of parallel sides lying in vertical planes which intersect both said shafts at an angle of forty-five degrees, a spherical friction member on said lever, a fixed friction member coacting therewith, spring means normally pressing said friction members together, and means for automatically maintaining the said pressure at a constant value while the lever is being operated.

In testimony whereof I affix my signature.

WALTER H. BARLING.